(12) United States Patent
Kazama et al.

(10) Patent No.: US 7,184,619 B2
(45) Date of Patent: Feb. 27, 2007

(54) BEAM DIRECTION MODULE AND OPTICAL SWITCH USING THE SAME

(75) Inventors: Atsushi Kazama, Kashiwa (JP); Kazuyuki Fukuda, Chiyoda (JP); Toshiya Shiramatsu, Chiyoda (JP); Masaya Horino, Yasato (JP); Yasuhiro Itou, Kumagaya (JP)

(73) Assignee: Hitachi, Ltd., Tokyo (JP)

( * ) Notice: Subject to any disclaimer, the term of this patent is extended or adjusted under 35 U.S.C. 154(b) by 10 days.

(21) Appl. No.: 10/890,131

(22) Filed: Jul. 14, 2004

(65) Prior Publication Data

US 2005/0013534 A1    Jan. 20, 2005

(30) Foreign Application Priority Data

Jul. 14, 2003 (JP) .............................. 2003-196183

(51) Int. Cl.
*G02B 6/26* (2006.01)

(52) U.S. Cl. ....................................................... 385/18

(58) Field of Classification Search ..................... None
See application file for complete search history.

(56) References Cited

U.S. PATENT DOCUMENTS

| | | | |
|---|---|---|---|
| 6,347,167 B1 * | 2/2002 | Hagelin ........................ | 385/18 |
| 6,504,967 B1 | 1/2003 | Zhou et al. | |
| 6,690,885 B1 * | 2/2004 | Aksyuk et al. ................ | 398/45 |
| 2002/0018615 A1 * | 2/2002 | Laor et al. ..................... | 385/18 |
| 2002/0097950 A1 * | 7/2002 | Zhang et al. .................. | 385/18 |
| 2002/0176657 A1 * | 11/2002 | Burke et al. ................... | 385/18 |
| 2003/0068117 A1 * | 4/2003 | Syms ............................ | 385/18 |
| 2003/0168942 A1 * | 9/2003 | Iino et al. ..................... | 310/331 |
| 2003/0169962 A1 * | 9/2003 | Rajan et al. ................... | 385/18 |
| 2004/0017599 A1 * | 1/2004 | Yang ........................... | 359/223 |

(Continued)

FOREIGN PATENT DOCUMENTS

JP            2002-518700         6/2002

(Continued)

OTHER PUBLICATIONS

U.S. Appl. No. 10/765,984, filed Jan. 29, 2004.

(Continued)

*Primary Examiner*—Michelle Connelly-Cushwa
*Assistant Examiner*—Chris Chu
(74) *Attorney, Agent, or Firm*—Antonelli, Terry, Stout and Kraus, LLP.

(57) ABSTRACT

A beam direction module which can be applied to an optical switch, comprising: a collimator support member; a first mirror substrate including first micro-mirrors, and first windows through which beams can pass; a first electrode substrate including first mirror driving electrodes, and second windows through which beams can pass; a first spacer; a second mirror substrate including second micro-mirrors, and third windows through which beams can pass; a second electrode substrate including second mirror driving electrodes, and fourth windows through which beams can pass; a second spacer; and an inter-mirror spacer, wherein the first electrode substrate, the first spacer, the first mirror substrate, the inter-mirror spacer, the second mirror substrate, the second spacer and the second electrode substrate are stacked successively on the collimator support member and fixed between caps and the collimator support member while pins protruding from the collimator support member are inserted into alignment through-holes formed.

17 Claims, 8 Drawing Sheets

U.S. PATENT DOCUMENTS

2004/0105616 A1* 6/2004 Kazama et al. ............... 385/18
2004/0146298 A1* 7/2004 Ikegame ..................... 398/45

FOREIGN PATENT DOCUMENTS

| KR | 2001-0071412 | 7/2001 |
| WO | WO 99/66354 | 12/1999 |
| WO | WO 01/79912 A3 | 10/2001 |

OTHER PUBLICATIONS

Office Action dated Mar. 9, 2006, issued in corresponding Korean Patent Application No. 10-2004-0054218.

* cited by examiner

BEAM DIRECTION MODULE AND OPTICAL SWITCH USING THE SAME

CROSS-REFERENCE TO RELATED APPLICATION

The present invention is related to U.S. patent application Ser. No. 10/417,104 entitled "OPTICAL SWITCH AND BEAM DIRECTION MODULE" filed on Apr. 17, 2003. The disclosure of the above U.S. application is herein incorporated by reference.

BACKGROUND OF THE INVENTION

The present invention relates to a beam direction module using mirrors to control directions of light beams and optical switch using the same.

In optical communication using optical fibers, there can be used an N-by-N optical switch, that is, an apparatus which has N input ports and N output ports and in which connection between the N input ports and the N output ports can be switched so that any one of optical signals sent to the N input ports through optical fibers can be connected to one of the N output ports.

In a general configuration of a switch called "three-dimensional optical matrix switch", a collimator array having collimators arranged in the form of an array for converting optical signals into light beams and outputting the light beams to a space and a micro-mirror array generally produced by a micro electro-mechanical system (MEMS) technique and having movable micro-mirrors arranged in the form of an array are paired with each other and disposed on each of input and output sides. The direction of a beam emitted from one of the collimators on the input side is controlled by two micro-mirrors so that the beam is led to any one of the collimators on the output side.

U.S. Pat. No. 6,504,967 has made description about an optical switch assembled in a passive alignment manner from a fiber array, a lens array and a movable mirror array produced by the MEMS technique.

In the general structure of the optical matrix switch, the collimator array and the micro-mirror array need to be fixed while positioned so that light beams of all channels emitted from the collimator array can be made accurately incident on corresponding micro-mirrors of the micro-mirror array respectively in order to achieve low-loss optical coupling.

In the conventional configuration of the optical switch, the lens array and the movable mirror array need to be disposed in postures oblique to each other and kept separate from each other so that the lens array does not interfere with beams reflected on the mirrors. It is conceived that beams emitted from the lens array have certain degrees of independent angular deviations respectively. For this reason, as the lens-mirror distance increases, the demand for higher fabrication accuracy of the lens array and higher positioning accuracy of the lens array and the movable mirror array increases in order to make all beams incident on the mirrors accurately. Moreover, the lens array and the movable mirror array are disposed so as to be oblique to each other. Accordingly, for example, passive alignment holes formed in the movable mirror array need to be fabricated obliquely. For this reason, the demand for higher angular accuracy of the holes and higher relative angular accuracy of surfaces of the passive alignment holding components in contact with the lens array and the movable mirror array increases. Accordingly, it is conceived that high positioning accuracy and high stability after fixing can be hardly obtained.

BRIEF SUMMARY OF THE INVENTION

Therefore, an object of the present invention is to provide an optical matrix switch which can overcome the aforementioned problem and which can be assembled easily with a low loss while a collimator array is positioned relative to a movable mirror array accurately and easily.

In order to solve the foregoing problem, for example, the invention is configured as follows.

(1) A beam direction module which can control directions of light beams is configured as follows.

That is, the beam direction module comprising: a collimator support member including collimator lenses connected to optical fibers respectively; a first mirror substrate including first mirrors; and a second mirror substrate disposed on a side of the first mirror substrate opposite to a side on which the collimator support member is disposed, the second mirror substrate including second mirrors provided so as to correspond to the first mirrors, wherein: beams emitted from the collimator lenses are formed so that the beams are reflected on the second mirrors and further reflected on the first mirrors and then radiated to the outside; the first mirror substrate is provided with windows through which the beams pass before the beams reach the second mirrors; the second mirror substrate is provided with windows through which the beams reflected from the first mirrors pass; the beam direction module further comprises fixing members provided to pierce a stack of the first mirror substrate and the second mirror substrate in a direction of lamination; and the fixing members are formed so as to be connected to the collimator support member.

(2) Further, as a specific structure example, the beam direction module can be formed as follows.

That is, the beam direction module comprising: the collimator support member; the first mirror substrate; a first driving substrate including driving mechanisms for driving the first mirrors, and second windows; the second mirror substrate; and a second driving substrate including driving mechanisms for driving the second mirrors, and fourth windows, wherein: beams emitted from the collimator lenses are formed so that the beams pass through the second windows and the first windows and are reflected on the second mirrors, the beams reflected on the second mirrors are radiated to the first mirrors, and the beams reflected on the first mirrors pass through the third windows and the fourth windows and are radiated to the outside; the beam direction module further comprises fixing members provided to pierce a stack of the first mirror substrate, the first driving substrate, the second mirror substrate and the second driving substrate in a direction of lamination; and the fixing members are formed so as to be connected to the collimator support member.

Further, as another specific configuration, the beam direction module may be formed as follows.

That is, the beam direction module which can control directions of light beams, comprising: a collimator support member for supporting collimators emitting beams; a first mirror substrate including first micro-mirrors serving as first mirrors, and first windows through which beams can pass; a first electrode substrate as a first driving substrate including first mirror driving electrodes as driving mechanisms for driving the first micro-mirrors, and second windows through which beams can pass; a first spacer interposed between the first mirror substrate and the first electrode substrate; a second mirror substrate including second micro-mirrors, and third windows through which beams can pass; a second electrode substrate including second mirror driving electrodes for driving the second micro-mirrors, and fourth windows through which beams can pass; a second spacer interposed between the second mirror substrate and the second electrode substrate; and an inter-mirror spacer, wherein: the first electrode substrate, the first spacer, the first mirror substrate, the inter-mirror spacer, the second mirror substrate, the second spacer and the second electrode substrate are stacked successively on the collimator support member while alignment pins serving as fixing members protruding from the collimator support member are inserted in alignment through-holes formed in the first electrode substrate, the first spacer, the first mirror substrate, the inter-mirror spacer, the second mirror substrate, the second spacer and the second electrode substrate respectively.

The beam direction module may further comprise pressing mechanisms by which the substrates stacked while pierced by the fixing members are pressed against the collimator support member.

As a specific example, the pressing mechanisms are springs interposed between ends of the fixing members and the second electrode substrate. Or the pressing mechanisms may be presser members each supported by the collimator support member and having a mechanism of pressing the substrates pierced by the fixing members against the collimator support member side. The pressing mechanisms may further include springs interposed between partial regions of the presser members and the second electrode substrate.

Further, in the paragraph (1), the beam direction module may further comprise regions in which beam emission side ends of the collimator lenses are disposed so as to partially protrude from a first mirror substrate side surface of the collimator support member toward the first mirror substrate side.

(3) The beam direction module may be formed so that mirror driving mechanisms are provided in a substrate in which mirrors are formed. Specifically, the beam direction module can be configured as follows.

That is, the beam direction module comprising: a collimator support member including collimator lenses connected to optical fibers respectively; a first mirror substrate including first mirrors, and first windows; and a second mirror substrate disposed on a side of the first mirror substrate opposite to a side on which the collimator support member is disposed, the second mirror substrate including second mirrors, and second windows, wherein: beams emitted from the collimator lenses are formed so that the beams pass through the first windows and are reflected on the second mirrors, the beams reflected on the second mirrors are radiated to the first mirrors, and the beams reflected on the first mirrors pass through the second windows and are radiated to the outside; either of the first and second mirror substrates includes driving mechanisms for driving the mirrors formed in the substrate; the beam direction module further comprises fixing members provided to pierce a stack of the first mirror substrate and the second mirror substrate in a direction of lamination; and the fixing members are formed so as to be connected to the collimator support member.

To describe the mode in the paragraph (3) in more detail, the driving mechanisms may be provided at least in mirror support portions for supporting the mirrors formed in the substrate.

Or the beam direction module formed as a beam direction module which can control directions of light beams, may comprises: a collimator support member for supporting collimators emitting beams; a first mirror substrate including first micro-mirrors, and first windows through which beams can pass; a second mirror substrate including second micro-mirrors, and second windows through which beams can pass; and an inter-mirror spacer, wherein: the first mirror substrate, the inter-mirror spacer and the second mirror substrate are stacked successively on the collimator support member while alignment pins protruding from the collimator support member are inserted in alignment through-holes formed in the first mirror substrate, the inter-mirror spacer and the second mirror substrate respectively.

Incidentally, in the mode described in the paragraph (3), the driving mechanisms may drive the mirrors by using piezoelectric elements. Or the driving mechanisms may drive the mirrors by using electromagnetic force.

(4) Incidentally, it is preferable that an optical switch is configured by using the aforementioned beam direction module. For example, the optical switch comprising a first beam direction module to which first optical fibers are connected, and a second beam direction module to which second optical fibers are connected and which is formed so as to correspond to the first beam direction module, wherein: a beam input through one of the first optical fibers passes through the first beam direction module and the second beam direction module and is output from the second beam direction module through selected one of the second optical fibers; and either of the first and second beam direction modules is a beam direction module defined in the paragraph (1).

The two beam direction modules are disposed opposite to each other as an input module and an output module so that beam coupling can be switched between any collimator of the input module and any collimator of the outside module.

(5) A preferred example of the optical switch may be specifically formed as follows. That is, the optical switch comprising: the first beam direction module formed so that the first fixing members are connected to the first collimator support member; a second beam direction module; and a base member, wherein: the second beam direction module includes: a second collimator support member having second collimator lenses connected to optical fibers respectively; a third mirror substrate having third mirrors; and a fourth mirror substrate disposed on a side of the third mirror substrate opposite to a side on which the second collimator support member is disposed, the fourth mirror substrate having fourth mirrors provided so as to correspond to the third mirrors; the first beam direction module is fixed to the base member by third fixing members; the second beam direction module is fixed to the base member by fourth fixing members; beams emitted from the first beam direction module are formed so that the beams are reflected on the third mirrors and further reflected on the fourth mirrors so that each of the reflected beams is radiated to selected one of the second collimator lenses; the third mirror substrate further has windows through which the beams reflected on the fourth mirrors pass; the fourth mirror substrate further has windows through which the beams pass before the beams are applied on the third mirrors; the second beam direction module further comprises second fixing members provided to pierce a stack of the third mirror substrate and the fourth mirror substrate in a direction of lamination; the second fixing members are formed so as to be connected to the second collimator support member.

Specifically, in the configuration, it is preferable that the beam direction modules are once fixed to support members and finally fixed to a common base member through the support members. In this case, for example, configuration may be made as follows. The first beam direction module is fixed to the base member through a first support member while the second beam direction module is fixed to the base member through a second support member. The first beam direction module is fixed to the first support member through fifth fixing members while the first support member is fixed to the base member through the third fixing members. The second beam direction module is fixed to the second support member through sixth fixing members while the second support member is fixed to the base member through the fourth fixing members.

As another specific mode, the optical switch may comprise a beam direction module, a base member, and a fixed mirror, wherein: the beam direction module includes first fixing members provided to pierce a stack of the first mirror substrate and the second mirror substrate in a direction of lamination; the first fixing members are formed so as to be connected to the collimator support member; the beam direction module is fixed to the base member by second fixing members; and the fixed mirror is fixed to the base member by the second fixing members.

When two mirror arrays having windows through which beams can pass are stacked on a collimator support member having collimators while an inter-mirror spacer is interposed between the two mirror arrays, a beam direction module can be formed so that a beam emitted from one of the collimators is reflected on corresponding two mirrors and passes through corresponding windows and is output from the beam direction module.

A parallel-plate electrostatic driving system is used for each mirror. Each mirror array includes: a mirror substrate having micro-mirrors and windows arranged therein; an electrode substrate having mirror driving electrodes and windows arranged therein; and a spacer for forming a gap between the mirror substrate and the electrode substrate.

It is possible to use passive alignment in which alignment pins protruding from the collimator support member are inserted in alignment through-holes arranged in the substrates and the spacers respectively. When both dimensional accuracy of the outer diameter of each of the alignment pins and dimensional accuracy of the inner diameter of each of the alignment through-holes are controlled, horizontal positioning can be made accurately. When the thickness of each of the substrates is controlled, vertical positioning can be made accurately.

As a method for fixing the stacked members, caps disposed at front ends of the pins or presser members fixed separately to the collimator support member may be used so the stacked members can be fixed between the caps or presser members and the collimator support member. On this occasion, springs may be interposed between the caps or presser members and the electrode substrate so that clamp load can be controlled easily.

The collimators and the mirror array may be positioned by means of pressing the front ends of the collimators against edges or side surfaces of the windows of the electrode substrate.

When two mirrors are provided as uniaxially movable mirrors different in axial direction from each other, the two mirrors can be used for rotating a beam around the two axes.

Each mirror array may be made of one substrate. As an example of the mirror array that can be made of one substrate, mirrors driven by piezoelectric elements or mirrors driven by electromagnetic force may be used.

According to the illustrated modes, the invention can provide an optical matrix switch which can overcome the aforementioned problem and which can be assembled easily with a low loss while relative positions of a collimator array and a movable mirror array are aligned accurately and easily.

Other objects, features and advantages of the invention will become apparent from the following description of the embodiments of the invention taken in conjunction with the accompanying drawings.

DETAILED DESCRIPTION OF THE INVENTION

Embodiments of the invention will be described below with reference to the accompanying drawings.

Incidentally, the invention is neither intended to limit its contents to specific contents described in this specification nor intended to exclude modifications based on findings which are known at the time of application or will become known in the future.

Figure 1:
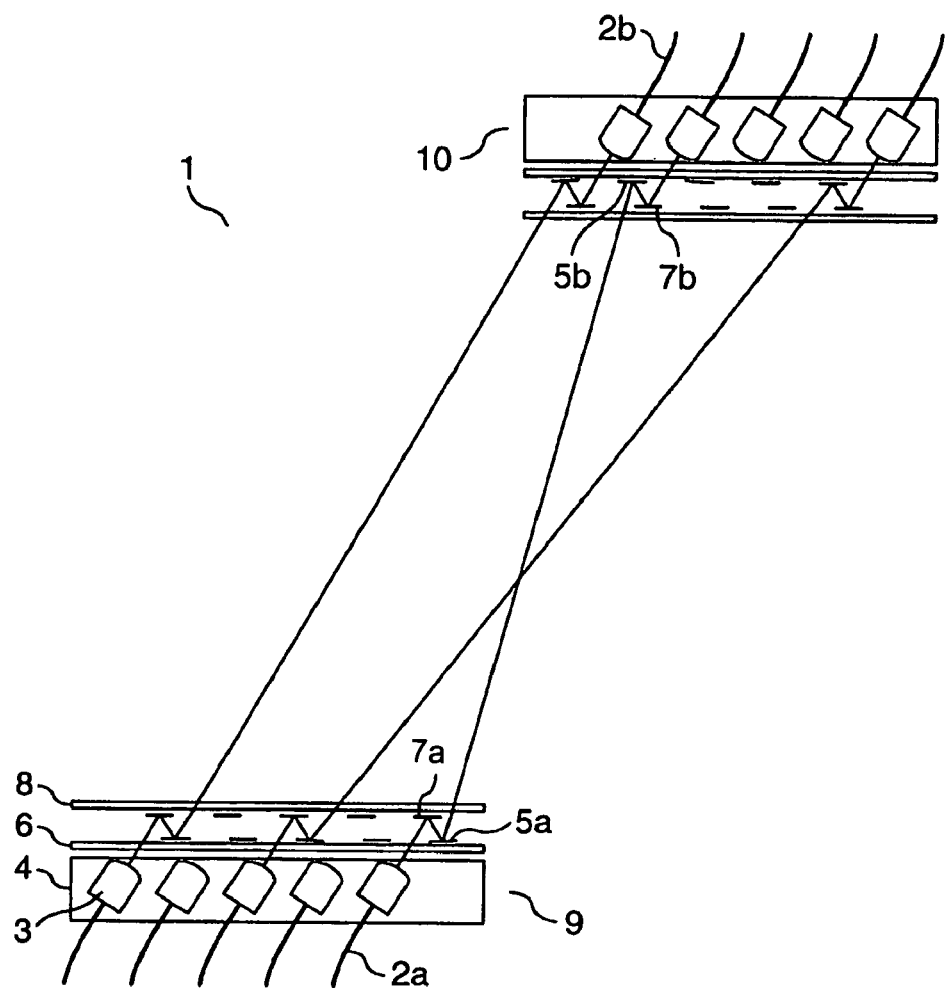
FIG. 1 is a sectional typical view schematically showing the overall configuration of a three-dimensional optical switch according to the invention.

FIG. 1 is a typical view schematically showing the overall configuration of an optical switch according to the invention. An optical switch 1 includes an input beam direction module 9 and an output beam direction module 10 disposed opposite to each other. Each of the modules 9 and 10 has a collimator array 4, a first mirror array 6, and a second mirror array 8. The collimator array 4 and the first and second mirror arrays 6 and 8 are integrated into each module. The collimator array 4 has an array of collimators 3 arranged for converting optical signals propagated through optical fibers 2 into collimated beams. The first mirror array 6 has an array of first micro-mirrors 5 each arranged to have a controllable angle of inclination. The second mirror array 8 has an array of second micro-mirrors 7 each arranged to have a controllable angle of inclination.

Coupling between any input fiber 2a on the input side and any output fiber 2b on the output side can be attained when inclination of a first input micro-mirror 5a corresponding to the input fiber 2a and inclination of a second input micro-mirror 7a are controlled so that a beam can be made incident on a first output micro-mirror 5b corresponding to the output fiber 2b, and when inclination of the first output micro-mirror 5b and inclination of a second output micro-mirror 7b corresponding to the output fiber 2b are controlled so that the beam incident on the first output micro-mirror 5b can be made incident on the output fiber 2b accurately.

Preferably, each first micro-mirror 5 and a corresponding second micro-mirror 7 are set as uniaxially movable mirrors having their rotation axes different from each other. In this configuration, the beam direction can be controlled two-dimensionally, so that any input fiber and any output fiber arranged two-dimensionally can be coupled to each other. Thus, an optical switch can be achieved. Preferably, the first micro-mirror can rotate around an axis as a first direction while the second micro-mirror can rotate around an axis as a second direction different from the first direction. Japanese Patent Application No. 2002-114099 has given detailed description about the basic configuration of such an optical switch and the effect of the optical switch. The invention mainly discloses a fabrication structure in which a beam direction module can be assembled accurately and easily.

Figure 2:
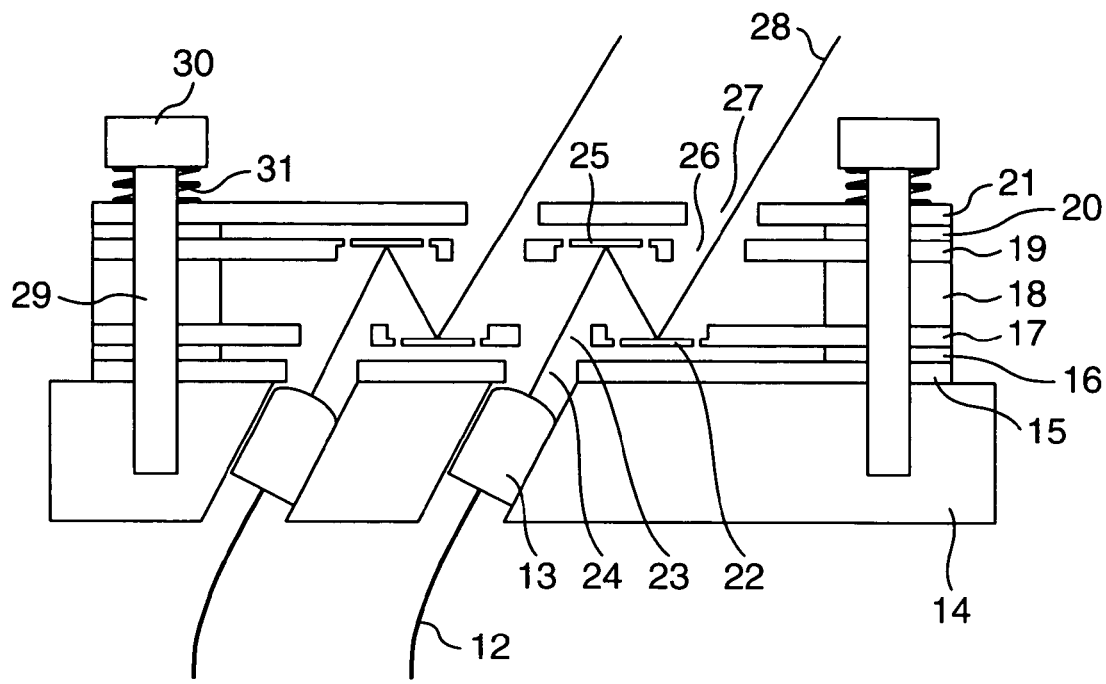
FIG. 2 is a sectional typical view showing the configuration of a beam direction module according to an embodiment of the invention.

FIG. 2 is a sectional typical view for explaining a more detailed configuration of a beam direction module 11 as one of constituent members of the optical switch according to a first embodiment of the invention.

In this embodiment, the beam direction module 11 is formed so that a first electrode substrate 15, a first spacer 16, a first mirror substrate 17, an inter-mirror spacer 18, a second mirror substrate 19, a second spacer 20, and a second electrode substrate 21 are stacked successively on a collimator support member 14 for supporting collimators 13 capable of converting optical signals propagated through fibers 12 into beams and outputting the beams. First micro-mirrors 22 rotatable by electrostatic force and first windows 23 through which beams can pass are arranged in the first mirror substrate 17. Electrodes (not shown) for driving the first micro-mirrors 22 and second windows 24 through which the beams can pass are arranged in the first electrode substrate 15. The first spacer 16 is inserted between the first mirror substrate 17 and the first electrode substrate 15 in order to form a suitable gap between the first micro-mirrors 22 and the electrodes of the first electrode substrate 15. Similarly, second micro-mirrors 25 and third windows 26 are arranged in the second mirror substrate 19. Electrodes (not shown) for driving the second micro-mirrors 25 and fourth windows 27 are arranged in the second electrode substrate 21. The second spacer 20 is inserted between the second mirror substrate 19 and the second electrode substrate 21. Further, the inter-mirror spacer 18 having a suitable thickness is inserted between the first mirror substrate 17 and the second mirror substrate 19. In this configuration, a beam 28 emitted from each of the collimators 13 passes through a corresponding second window 24 and a corresponding first window 23 and is reflected on a corresponding second micro-mirror 25 and further reflected on a corresponding first micro-mirror 22. The reflected beam passes through a corresponding third window 26 and a corresponding fourth window 27 and is output from the beam direction module 11.

Through-holes for alignment are formed in each of the first electrode substrate 15, the first spacer 16, the first mirror substrate 17, the inter-mirror spacer 18, the second mirror substrate 19, the second spacer 20 and the second electrode substrate 21. When the respective members, that is, the first electrode substrate 15, the first spacer 16, the first mirror substrate 17, the inter-mirror spacer 18, the second mirror substrate 19, the second spacer 20 and the second electrode substrate 21 are placed so that pins 29 protruding from the collimator support member pass through these through-holes, the respective members can be positioned relative to the collimators 13.

At least one characteristic of this embodiment is as follows. That is, the beam direction module 11 includes a collimator support member 14, a first mirror substrate 17, and a second mirror substrate 19. The collimator support member 14 has collimator lenses 13 connected to optical fibers 12. The first mirror substrate 17 has first micro-mirrors 22. The second mirror substrate 19 is disposed on a side of the first mirror substrate 17 opposite to the side on which the collimator support member 14 is disposed. The second mirror substrate 19 has second micro-mirrors 25 provided so as to correspond to the first micro-mirrors 22. The beam direction module 11 is formed so that beams emitted from the collimator lenses 13 are reflected on the second micro-mirrors 25 and further reflected on the first micro-mirrors 22 and then output from the beam direction module. The first mirror substrate 17 is provided with windows through which the beams pass before the beams reach the second micro-mirrors 25. The second mirror substrate 19 is provided with windows through which the beams reflected from the first micro-mirrors 22 pass. The beam direction module 11 further comprises pins 29 serving as fixing members so that the pins 29 pierce the stack of the first mirror substrate 17 and the second mirror substrate 19 in the direction of lamination. The pins 29 serving as fixing members are formed so as to be connected to the collimator support member 14.

When the first and second mirror substrates having the first and second micro-mirrors exerting large influence on optical loss so as to be hardly adjusted at the time of production are integrated with each other by common fixing members piercing the first and second mirror substrates in the aforementioned manner, a high-accuracy module can be formed because highly accurate positioning can be made easily compared with the case where the first and second mirror substrates are disposed separately and then positioned.

When the fixing members piercing the mirror substrates are connected to the collimator support member having the collimator lenses mounted therein to thereby fix the mirror substrates as a whole, constituent members of particularly important optical paths in the module can be fixed while disposed as a stacked structure through the common fixing members. Accordingly, it is possible to obtain a module assembled easily and having high-accuracy optical paths.

In an electrostatically driven type micro-mirror, dimensional accuracy of the width of a gap between the mirror and a corresponding electrode is very important. If the gap is narrower than a designed value, a pull-in phenomenon in which the mirror is attracted by the electrode occurs before the tilt angle of the mirror satisfies a required maximum tilt angle. On the other hand, if the gap is too wide, the tilt angle of the mirror cannot reach the required maximum tilt angle even in the case where a maximum voltage is applied to the electrode. According to the configuration of the invention, the gap width can be formed with high accuracy because the dimensional accuracy of the gap can be controlled on the basis of the dimensional accuracy of the thicknesses of the first and second spacers 16 and 20. Vertical positions of the first and second micro-mirrors 22 and 25 relative to each other can be also controlled with high accuracy on the basis of the thickness of the inter-mirror spacer 18.

With respect to horizontal positioning accuracy, the size of each of the through-holes formed in the respective members is set to be slightly larger than the size of a corresponding pin 29 under consideration of facilitation of fabrication. Accordingly, there is a possibility that positional displacement caused by the slight size difference between the through-hole and the pin 29 may occur in terms of horizontal positioning accuracy. A maximum of the positional displacement can be however estimated on the basis of the set sizes of the through-hole and the pin. In addition, even in the case where the respective members are stacked, horizontal positional displacements of the respective members need not be added up because the horizontal positional displacements of the respective members are based on the same pin 29. Accordingly, the total positional displacement can be suppressed to a very small value. As described above, high accuracy can achieved in terms of both vertical positioning accuracy and horizontal positioning accuracy.

When this configuration is used, the respective members can be stacked easily while the pins 29 are inserted in the respective members. Accordingly, the beam direction module can be assembled manually easily. On the other hand, the background art requires an active alignment method in which a mirror array is positioned by an alignment stage, etc. while positions of beams emitted from collimators are detected. In addition, in the background art, it is difficult to fix the mirror array in the aligned position without any displacement. On the contrary, in the configuration according to the invention, the cost required for developing alignment and fabrication devices and the cost required for aligning and fabricating each switch can be reduced greatly because a passive alignment method requiring only fabrication is used. Accordingly, an inexpensive optical switch can be attained.

In this configuration, the distance between each collimator and a corresponding micro-mirror can be made shorter compared with the configuration according to the background art. Accordingly, a beam hardly goes out of range of the micro-mirror even if the optical axis of the collimator is displaced slightly. In the configuration according to the background art, it is impossible to perform good alignment to obtain high coupling efficiency in all channels unless directions of the optical axes of all the collimators in the collimator array are adjusted with high accuracy. On the other hand, in the configuration according to the invention, allowance to displacement of the optical axis of each collimator is high.

The collimators 13 can convert optical signals propagated through the fibers 12 into parallel beams and output the parallel beams. For example, a collimator formed by fusion-bonding an end of a fiber to an end of a surface of a cylindrical collimator lens opposite to a lens surface thereof may be used as each of the collimators 13. As a method for fixing the collimators 13 while orienting the axial directions of the collimators 13, for example, a method of inserting and bonding the collimators 13 into through-holes formed in the collimator support member 14 may be used. When positioning accuracy of the optical axes of the collimators 13 relative to outside dimensional axes of the collimators 13 and dimensional accuracy of the outer diameter of each collimator 13 relative to the inner diameter of a corresponding through-hole are controlled highly, a collimator array having collimators with optical axes oriented in one direction can be formed.

To fabricate a mirror structure and windows and through-holes in each of the mirror substrates, for example, there may be used a bulk microfabricating method in which a silicon wafer used as a base material is fabricated by dry etching or wet etching in the condition that the silicon wafer is masked by photolithography. A film of a metal such as Au is formed on a beam-reflecting surface of the mirror substrate by a method such as sputtering or vapor deposition to thereby a reflecting surface.

The electrode substrate can use a silicon wafer, a ceramic substrate or the like as a base material. Electrodes and wires may be formed by a film-forming method such as sputtering, vapor deposition or plating and patterned by photolithography. Etching, fabricating, laser fabricating or the like may be used for fabricating windows and through-holes.

The spacer interposed between the mirror substrate and the electrode substrate needs to be sufficiently thin. That is, accuracy of thickness is required of the spacer. For example, it is preferable that the spacer is produced by means of etching a silicon wafer to reduce the thickness of the silicon wafer.

Although through-holes in the inter-mirror spacer may be formed by etching, the through-holes may be formed by fabricating because the through-holes do not require high dimensional accuracy. Since the inter-mirror spacer is thick, a metal material such as Kovar or Invar or glass which is a material having a coefficient of thermal expansion close to that of silicon may be used as the material of the inter-mirror spacer.

A metal material such as Kovar or Invar or glass which is a material having a linear expansion coefficient close to that of silicon may be preferably used as the material of the collimator support member and the alignment pins.

When the electrode substrates, the spacers, the inter-mirror spacer, the collimator support member, the alignment pins, and so on, are made of the aforementioned material having a linear expansion coefficient close to that of silicon in the condition that silicon is used as the material of the mirror substrates, displacement caused by thermal deformation differences between the respective members in accordance with change in temperature in the assembled state can be reduced to make it possible to provide a highly reliable beam direction module and a highly reliable optical switch.

Incidentally, the materials for forming the respective members and the methods for fabricating the respective members are not limited to the illustrated examples.

When a function of attaching caps 30 to the front ends of the alignment pins 29 opposite to the collimator support member 14 side ends and pressing the caps 30 against the second electrode substrate 21 through elastic components such as springs 31, for example, as shown in FIG. 2, is provided as a method for fixing the respective members ranging from the first electrode substrate 15 to the second electrode substrate 21, the respective members can be fixed in a lump. For example, the respective stacked members may be fixed from the top of the second electrode substrate while the stacked respective members are sandwiched between the springs 31 and the collimator support member.

When the respective members are fixed while pressed, there is a possibility that the second electrode substrate 21 may be damaged if the pressing load imposed on the respective members is too high. On the other hand, there is a possibility that the respective members may be displaced from one another by shock, vibration, etc. after fabrication if the pressing load is too low. When the springs 31 are interposed between the caps 30 and the second electrode substrate 21, the respective members can be fixed with a suitable pressing load. In the configuration according to the invention, since the respective members are in contact with each other surface by surface, the respective members are so tolerant of the pressing load that the respective members can be fixed with a sufficient high load. Any material can be used as the material of the springs 31 if the material is elastic. For example, each spring 31 may be made of metal and shaped like a coiled spring as shown in FIG. 2 or like a plate spring. Alternatively, each spring 31 may be made of rubber and shaped like a plate or like a ring. The pins can be connected to the caps by a method such as bonding or thread engagement between threaded ends of the pins and threaded portions of the caps.

Although this embodiment has shown the case where a lens as an example of a collimator lens is mounted on each optical fiber, the lens may be dispensed with when the aforementioned collimator lens is not provided but light from the optical fiber is radiated onto a corresponding second mirror directly or through another member than the lens. In this case, the collimator support member as illustrated in the drawings and the description may be used as a member for supporting the optical fibers.

Figure 3:
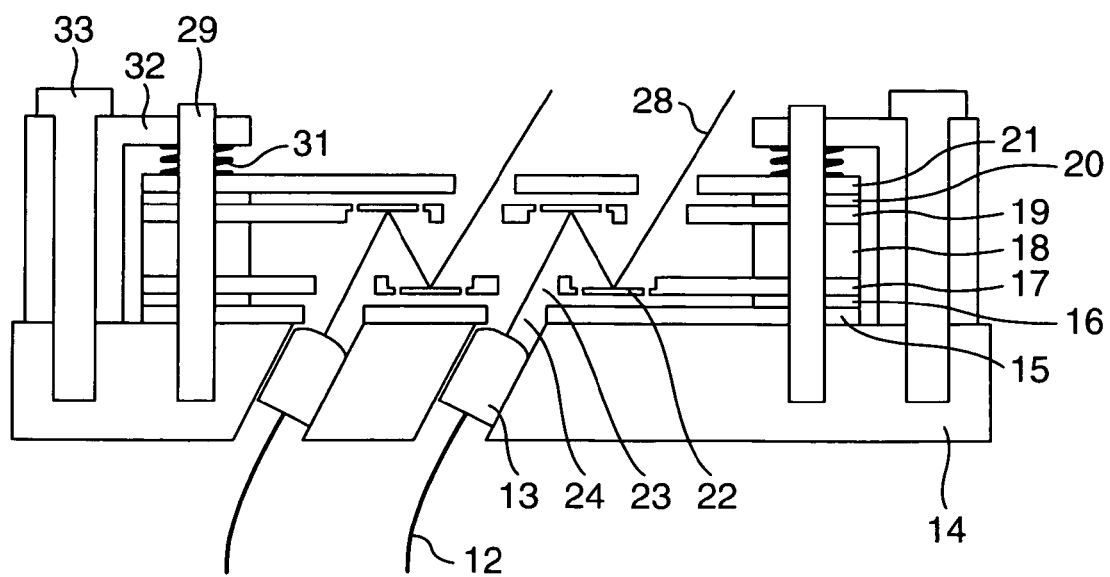
FIG. 3 is a sectional typical view showing the configuration of a beam direction module according to an embodiment of the invention.

A second embodiment will be described below. As shown in FIG. 3, presser members 32 provided separately so as to be fixed to the collimator support member 14 may be used for pressing the upper surface of the second electrode substrate 21 through the springs 31 to fix the respective members. The other basic configuration used in the second embodiment may be the same as that in the first embodiment. The presser members 32 are fixed to the collimator support member 14, for example, by bolts 33. The pins 29 can be connected to the pressure members 32. Also in this embodiment, a suitable pressing load can be obtained regardless of clamping force of the bolts 33. In this embodiment, the respective members can be entirely fixed when the presser members 32 are fixed by the bolts 33. Accordingly, assembly and decomposition can be made easily in comparison with the first embodiment in which the caps are attached to the front ends of the pins respectively.

Figure 4:
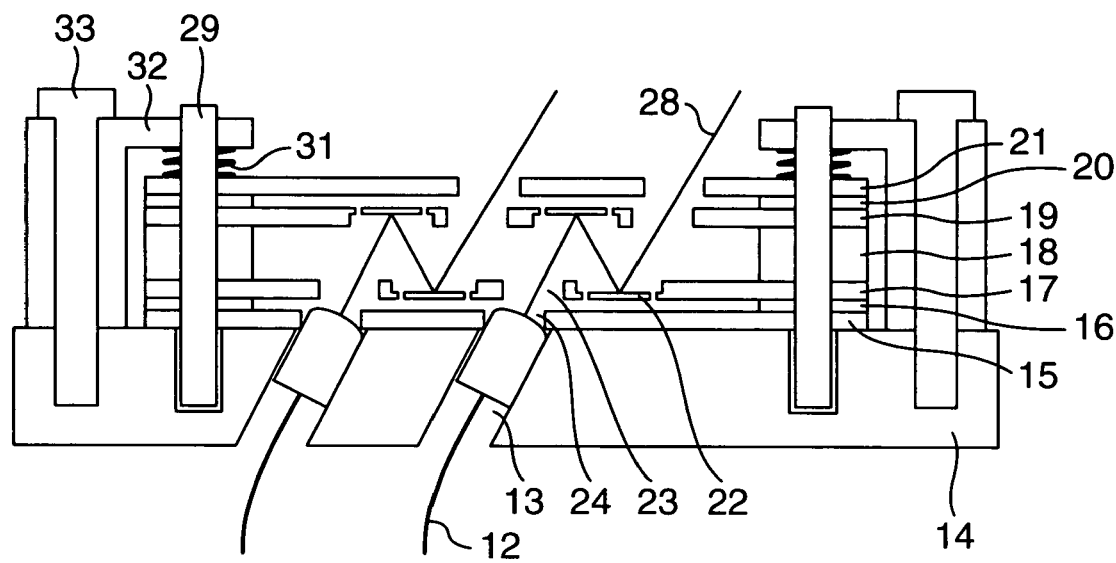
FIG. 4 is a sectional typical view showing the configuration of a beam direction module according to an embodiment of the invention.

FIG. 4 is a sectional view for schematically explaining another embodiment (third embodiment) of a fabrication structure of the beam direction module. In the first and second embodiments, all members ranging from the collimators to the second mirror substrate are positioned by the alignment pins. On the other hand, in this embodiment (third embodiment), front ends of collimators are made to protrude from the collimator support member so that the collimators are directly positioned relative to the first electrode substrate. The beam direction module has regions in which the beam emission side ends of the collimators are disposed to partially protrude from the first mirror substrate side surface of the collimator support member toward the first mirror substrate side. The front ends of the collimators are pressed against side surfaces or edges of second windows formed in the first electrode substrate. When at least two of the collimators are subjected to this positioning technique, the collimator support member and the first electrode substrate can be positioned relative to each other. The members ranging from the first electrode substrate to the second electrode substrate are positioned by pins in the same manner as in the first embodiment.

This embodiment can be applied to the case where it is difficult to assemble the collimators and the alignment pins accurately in terms of positions and angles of the collimators relative to the alignment pins because the axial direction of the collimators is not parallel with the axial direction of the alignment pins. That is, in this embodiment, more accurate positioning can be made because the collimators are directly positioned relative to the second windows.

All the members shown in each of FIGS. 2 to 4 which are sectional views need not be located on one section. In each of FIGS. 2 to 4, all the members are shown in one section for the sake of simplification of description.

FIGS. 5 to 9 are views showing examples of planar configurations of constituent members of an electrostatically driven micro-mirror array in the case where 2-by-2 channels, that is, four channels are used.

Figure 5:
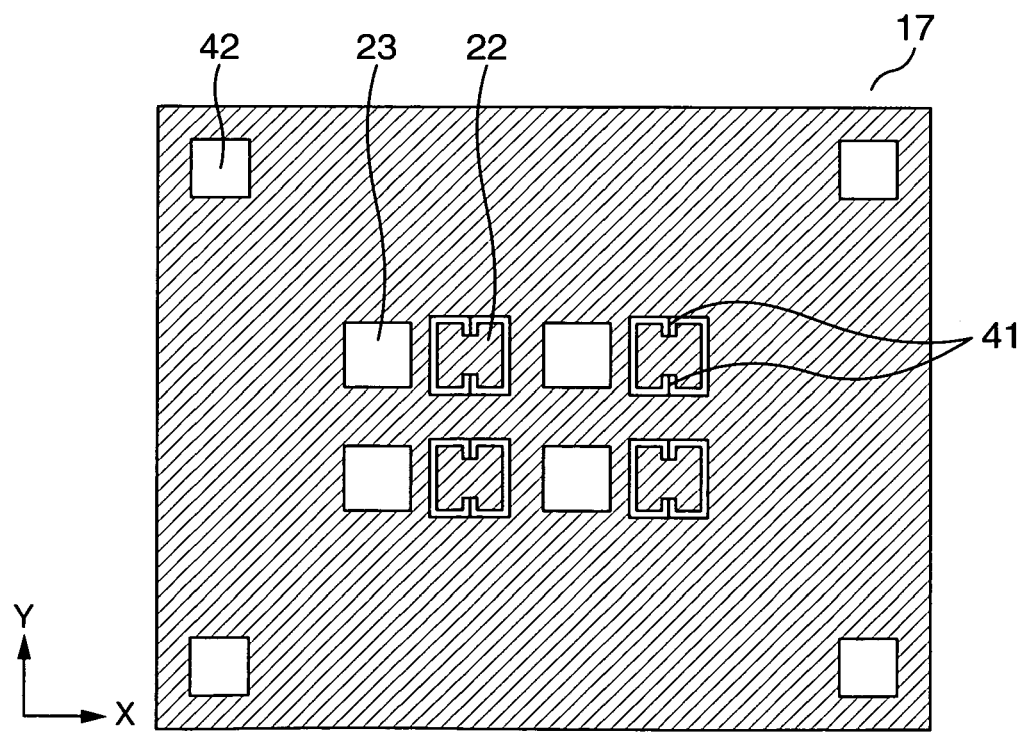
FIG. 5 is a planar typical view showing an example of the configuration of a first mirror substrate.
Figure 6:
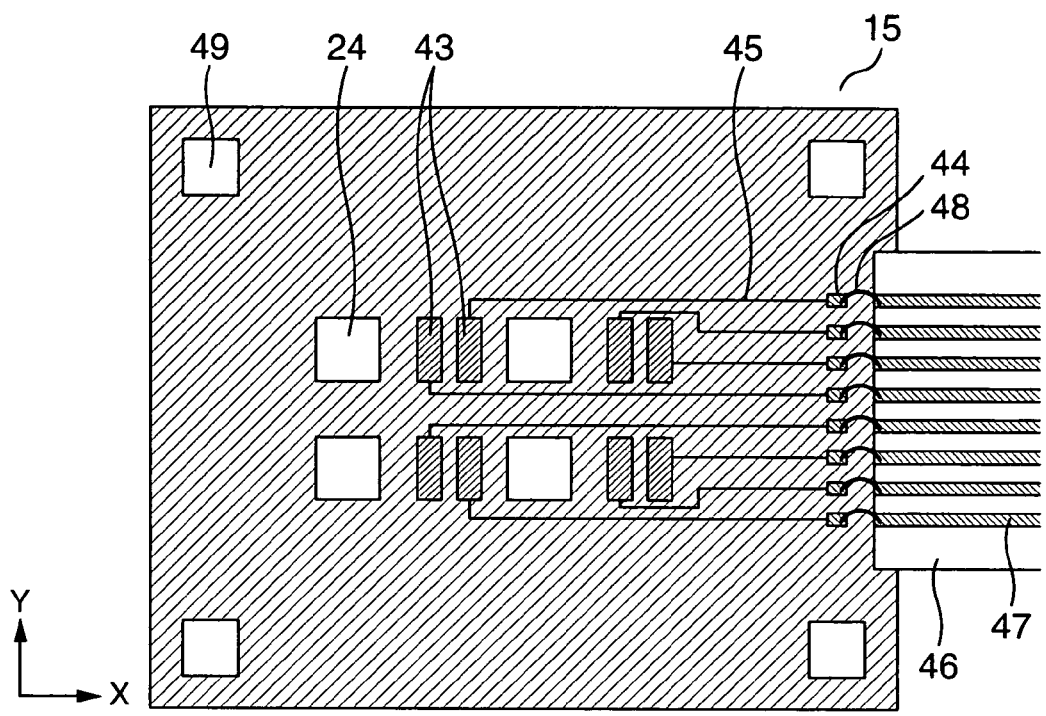
FIG. 6 is a planar typical view showing an example of the configuration of a first electrode substrate.
Figure 7:
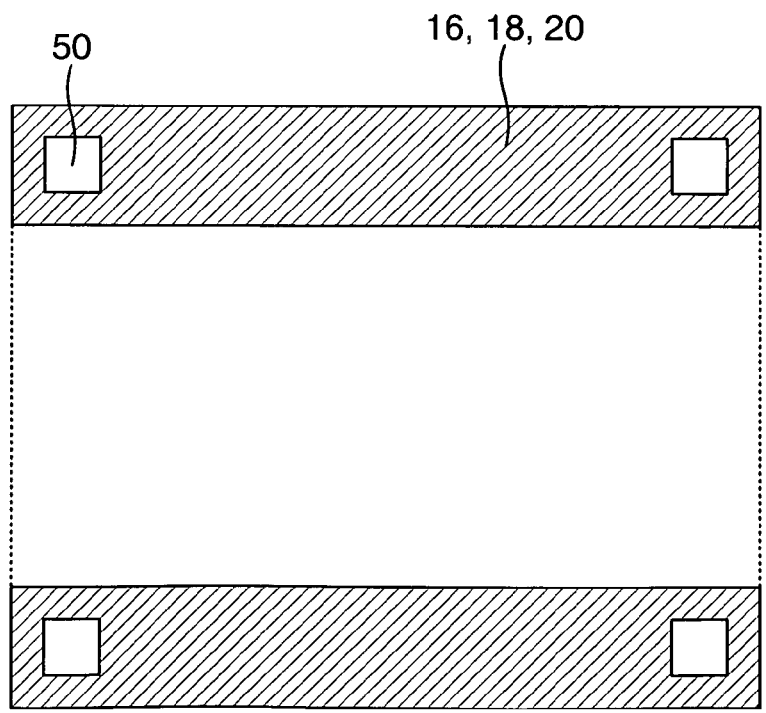
FIG. 7 is a planar typical view showing an example of the configuration of a first spacer, a second spacer, and an inter-mirror spacer.

FIGS. 5 to 7 show examples of planar configurations of a first mirror substrate 17, a first electrode substrate 15 and a first spacer 16 respectively. As shown in FIG. 5, first micro-mirrors 22 and first windows 23 paired with the first micro-mirrors 22 are arranged as four channels in the first mirror substrate 17. Each first micro-mirror 22 is formed to be rotatable around one rotation axis. For example, a configuration in which each mirror is supported to the substrate by two twist bars 41 as shown in FIG. 5 can be used as the simplest configuration of each first micro-mirror 22. Each first window 23 is constituted by a through-hole formed in the substrate. In addition, alignment through-holes 42 are formed in the first mirror substrate 17 so that the alignment pins 29 can be inserted in the alignment through-holes 42. Although various modifications can be conceived with respect to the shape and location of each alignment through-hole 42 and the number of the alignment through-holes 42, this embodiment shows the case where the alignment through-holes 42 are disposed at four corners. It is preferable that cylindrical pins are used as the alignment pins 29.

As shown in FIG. 6, first mirror driving electrodes 43 and second windows 24 paired with the first mirror driving electrodes 43 are arranged as four channels in the first electrode substrate 15 corresponding to the first mirror substrate 17. For example, leading of wires for applying a voltage to the first mirror driving electrodes 43 can be achieved by the following configuration. Wire-bonding electrodes 44 are formed in a peripheral portion of the first electrode substrate. Wires 45 are formed for connecting the wire-bonding electrodes 44 to the first mirror driving electrodes 43 respectively. Wires 47 of a first flexible printed circuit board 46 bonded to the first electrode substrate 15 are connected to the wire-bonding electrodes 44 by wires 48 respectively. In this configuration, a voltage can be applied to the first mirror driving electrodes 43 through the flexible printed circuit board 46. Alignment through-holes 49 are formed at four corners of the first electrode substrate 15 in the same manner as in the first mirror substrate 17.

First spacers are disposed in regions which do not interfere with the first micro-mirrors 22, the first windows 23, the second windows 24, the flexible printed circuit board 46, the wires 48, etc. when the first spacers are stacked together with the first mirror substrate 17 and the first electrode substrate 15. For example, as shown in FIG. 7, two first spacers are disposed in upper and lower peripheral regions respectively. When two alignment through-holes 50 are formed in each region in advance, the first spacers can be positioned by pins.

Arrangement and thicknesses of the respective members are determined so that the first mirror driving electrodes 43 are located just under the first micro-mirrors 22 and that the first and second windows 23 and 24 are located just in beam passages when the first electrode substrate 15, the first spacers 16 and the first mirror substrate 17 are stacked successively while the pins 29 are inserted in the alignment through-holes respectively.

Figure 8:
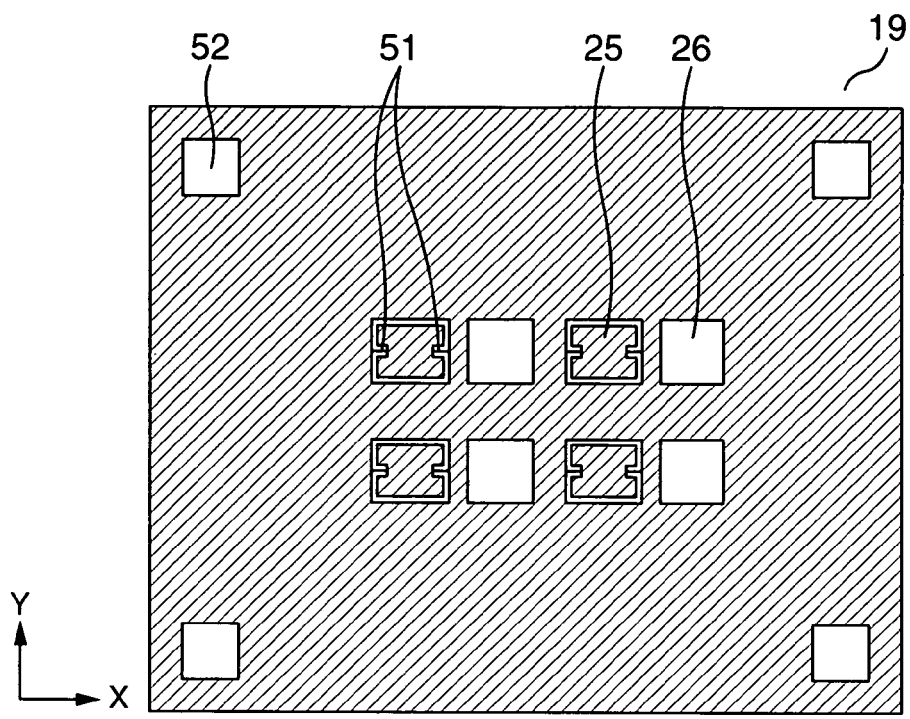
FIG. 8 is a planar typical view showing an example of the configuration of a second mirror substrate.
Figure 9:
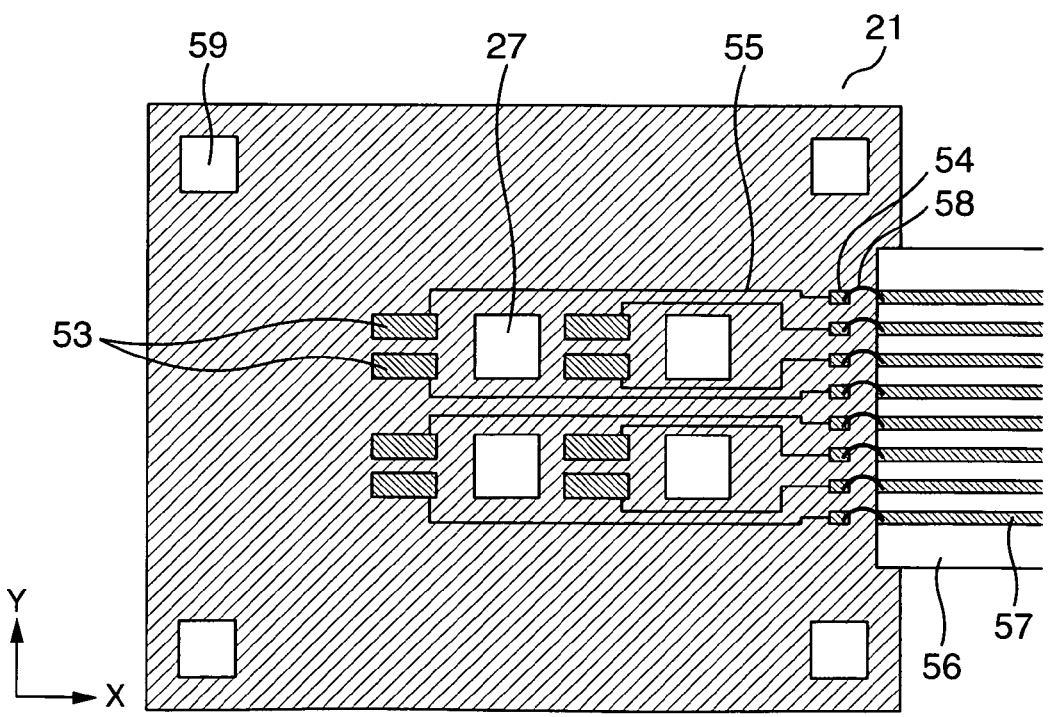
FIG. 9 is a planar typical view showing an example of the configuration of a second electrode substrate.

FIGS. 8 and 9 show examples of planar configurations of a second mirror substrate 19 and a second electrode substrate 21 respectively. Second micro-mirrors 25 and third windows 26 paired with the second micro-mirrors 25 are arranged as four channels in the second mirror substrate 19 in the same manner as in the first mirror substrate 17. Each second micro-mirror can use a structure in which each second micro-mirror is supported by two torsion bars 51. Alignment through-holes 52 are formed at four corners of the second mirror substrate 19.

Second mirror driving electrodes 53 and fourth windows 27 paired with the second mirror driving electrodes 53 are arranged as four channels in the second electrode substrate 21 in the same manner as in the first electrode substrate 15. Wire-bonding electrodes 54 are connected to the second mirror driving electrodes 53 by wires 55 respectively. Wires 57 of a second flexible printed circuit board 56 bonded to the second electrode substrate 21 are connected to the wire-bonding electrodes 54 by wires 58 respectively. In this configuration, a voltage can be applied to the second mirror driving electrodes 53 through the second flexible printed circuit board 56. In addition, alignment through-holes 59 are formed at four corners of the second electrode substrate 21.

Second spacers 20 can be formed in the same configuration as that of the first spacers 16 shown in FIG. 7. Each inter-mirror spacer 18 is thicker than each first spacer 16 and each second spacer 20 but can have the same planar configuration as that of the first spacer 16 shown in FIG. 7.

Arrangement and thicknesses of the respective members are determined so that the second mirror mirrors 25, the first micro-mirrors 22, the third windows 26 and the fourth windows 27 are located in the beam passages when the inter-mirror spacers 18, the second mirror substrate 19, the second spacers 20 and the second electrode substrate 21 are further stacked successively on the first electrode substrate 15 while the alignment pins 29 are inserted in the alignment through-holes respectively. The sizes of the micro-mirrors and the windows are determined so that increase in loss can be prevented from being caused by beams' being partially out of range of the micro-mirrors or the windows even in the case where the beams are tilted at a maximum tilt angle for coupling any two channels in a switching operation. Each first micro-mirror 22 and each second micro-mirror 25 have independent rotation axes (preferably perpendicular to each other) respectively so that the rotation axis of the first micro-mirror 22 is parallel with the Y axis as shown in FIG. 5 while the rotation axis of the second micro-mirror 25 is parallel with the X axis as shown in FIG. 8. Thus, directions of the beams can be controlled two-dimensionally by use of the first and second micro-mirrors. Alternatively, the first and second micro-mirrors may be disposed so that the first micro-mirrors can rotate around the X axis while the second micro-mirrors can rotate around the Y axis.

For example, the first mirror substrate 17 and the second mirror substrate 19 may be subjected to a micro electromechanical system (MEMS) technique for fabricating silicon substrates by etching, photo-lithography or the like so that mirrors, torsion bars, through-holes, etc. can be formed in the first mirror substrate 17 and the second mirror substrate 19. The mirrors are made movable because the torsion bars can be elastically deformed by electrostatic force. Besides straight joists shown in FIGS. 5 and 8, for example, meander joists 61 obtained by folding straight joists back several times as shown FIG. 10 may be used as the torsion bars. In this case, a mirror portion 62 supported by meander portions can be rotated easily because rigidity against twisting can be reduced more greatly even in the case where the sectional area of each joist remains unchanged.

Although the embodiment has shown the structure of parallel-plate electrostatically driven mirrors formed by using two substrates, that is, one mirror substrate and one electrode substrate in combination, the invention may be applied to the structure of another driven type mirrors formed by using one substrate.

Figure 11:
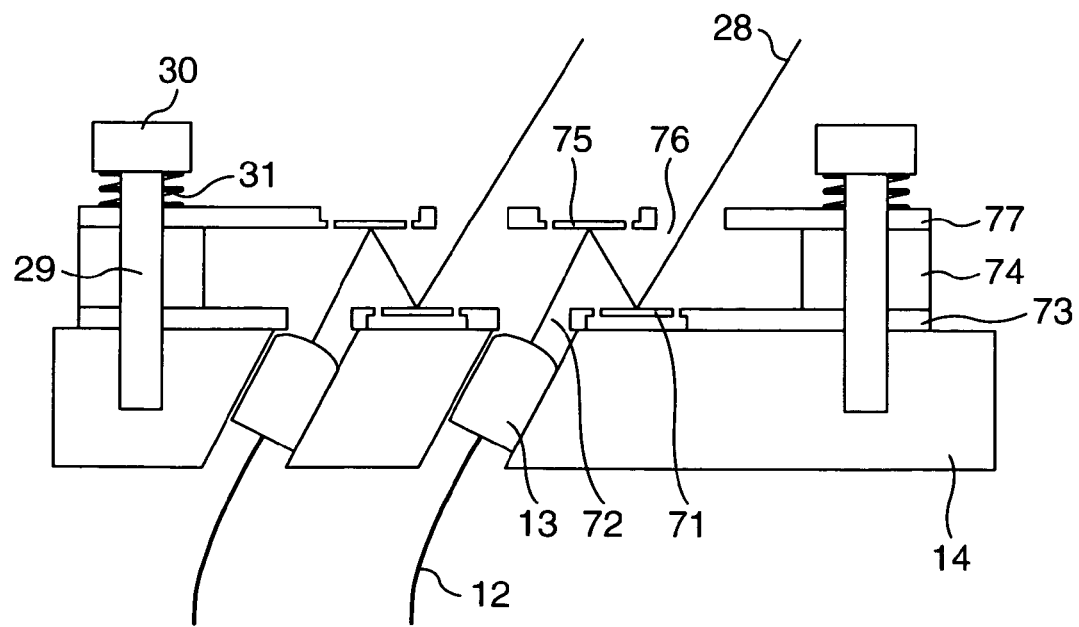
FIG. 11 is a sectional typical view showing the configuration of a beam direction module according to an embodiment of the invention.

FIG. 11 is a schematically sectional view showing a fourth embodiment of the invention in the case where a movable mirror array is formed by using one substrate. First micro-mirrors 71 and first windows 72 are arranged in a first movable mirror array 73. Second micro-mirrors 75 and second windows 76 are arranged in a second movable mirror array 77. The first movable mirror array 73, inter-mirror spacers 74 and the second movable mirror array 77 are stacked successively on a collimator support member while alignment pins 29 are inserted in through-holes formed in the first movable mirror array 73, the inter-mirror spacers 74 and the second movable mirror array 77 respectively. The first movable mirror array 73, the inter-mirror spacers 74 and the second movable mirror array 77 are fixed by springs 31 and caps 30. The beam direction module has a mechanism for rotating the first micro-mirrors 71 around an axis and rotating the second micro-mirrors 75 around an axis different in direction from the rotation axis of the first micro-mirrors 71.

It is a matter of course that presser members may be used in the same manner as in the second embodiment shown in FIG. 3 or that front ends of collimators and first windows may be used for positioning the respective members in the same manner as in the fourth embodiment shown in FIG. 4.

Figure 12:
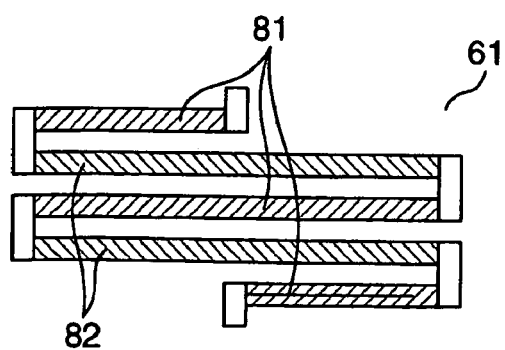
FIG. 12 is a planar typical view showing an example of the configuration of a meander joist which is driven to be twisted by piezoelectric elements.
Figure 10:
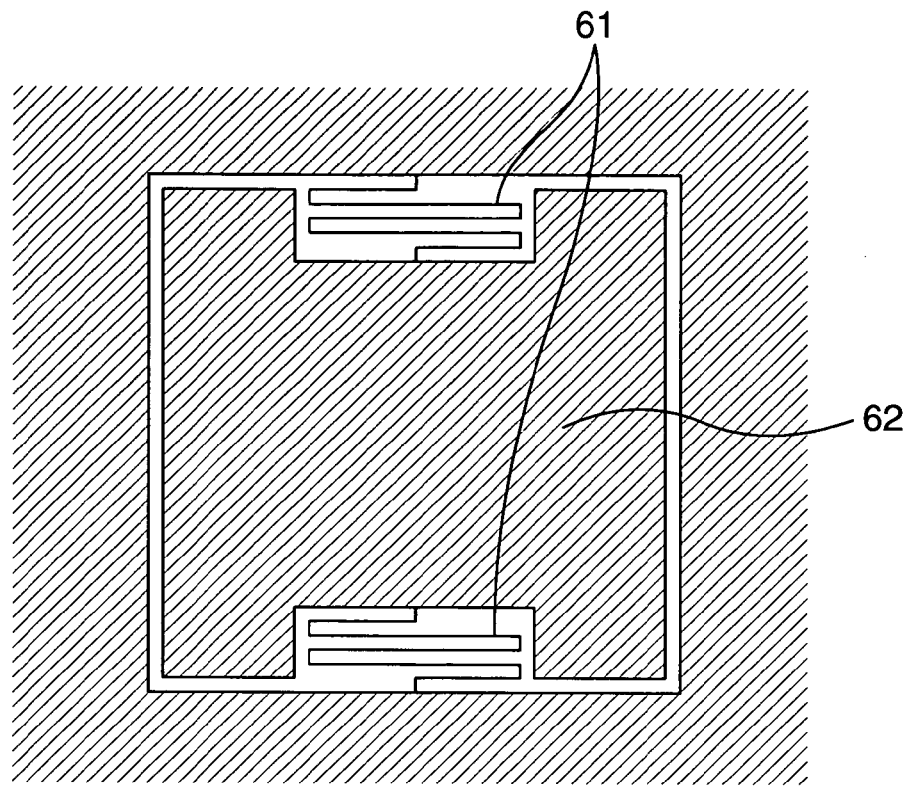
FIG. 10 is a planar typical view showing an example of the structure of a mirror supported by meander joists.

For example, movable mirrors formed by using one substrate may be driven by piezoelectric elements. As the structure of the movable mirrors using piezoelectric elements, for example, a configuration in which piezoelectric elements are formed on meander joists 61 may be used in the structure in which each mirror portion 62 is supported by meander joists 61 as shown in FIG. 10. FIG. 12 shows an example of the configuration of each meander joist twisted by piezoelectric elements. First piezoelectric elements 81 and second piezoelectric elements 82 are formed alternatively on surfaces of folded straight joist parts of the meander joist 61 respectively and connected to one another by a wire. The direction of polarization of the first piezoelectric elements 81 and the direction of polarization of the second piezoelectric elements 82 are set to be reserved to each other. When, for example, a positive voltage is applied on the meander joint 61 through the wire, the first piezoelectric elements 81 shrink while the second piezoelectric elements 82 expand. On the other hand, when a negative voltage is applied on the meander joist 61 through the wire, the first piezoelectric elements 81 expand while the second piezoelectric elements 82 shrink. In this manner, each meander joist 61 is twisted in accordance with the voltage so that the mirror portion 62 can be rotated.

For example, electromagnetically driven mirrors may be also used. For example, a coil is formed on the surface of each mirror portion supported by suitable torsion bars while a permanent magnet is disposed on the outside. In this configuration, electromagnetic force can be generated in accordance with the current flowing in the coil to thereby rotate each mirror.

The beam direction module disclosed in the invention is not limited to application to the optical switch. For example, the beam direction module according to the invention can be used in a laser printer, a laser exposure fabricate, a display or the like so that directions of light beams can be controlled and retained accurately by one beam direction module or light beams can be scanned by one beam direction module. In the beam direction module according to the invention, two uniaxially movable mirrors are used for controlling the direction of each beam. Accordingly, because the axes of the two uniaxially movable mirrors can be operated independent of each other, there is no interference between the axes though such interference is found in biaxially movable mirrors as a phenomenon in which when an angle of rotation around one axis is changed, an angle of rotation around the other axis will be changed. Accordingly, in the beam direction module according to the invention, directions of beams can be controlled easily, so that beams can be scanned easily, for example, in the form of a lattice. In the case of the electrostatically driven mirrors, areas of electrodes for driving the mirrors can be made large compared with the case of the biaxially movable mirrors. Accordingly, it is possible to improve basic performance of each mirror, such as maximum tilt angle and velocity of each mirror.

Figure 13:
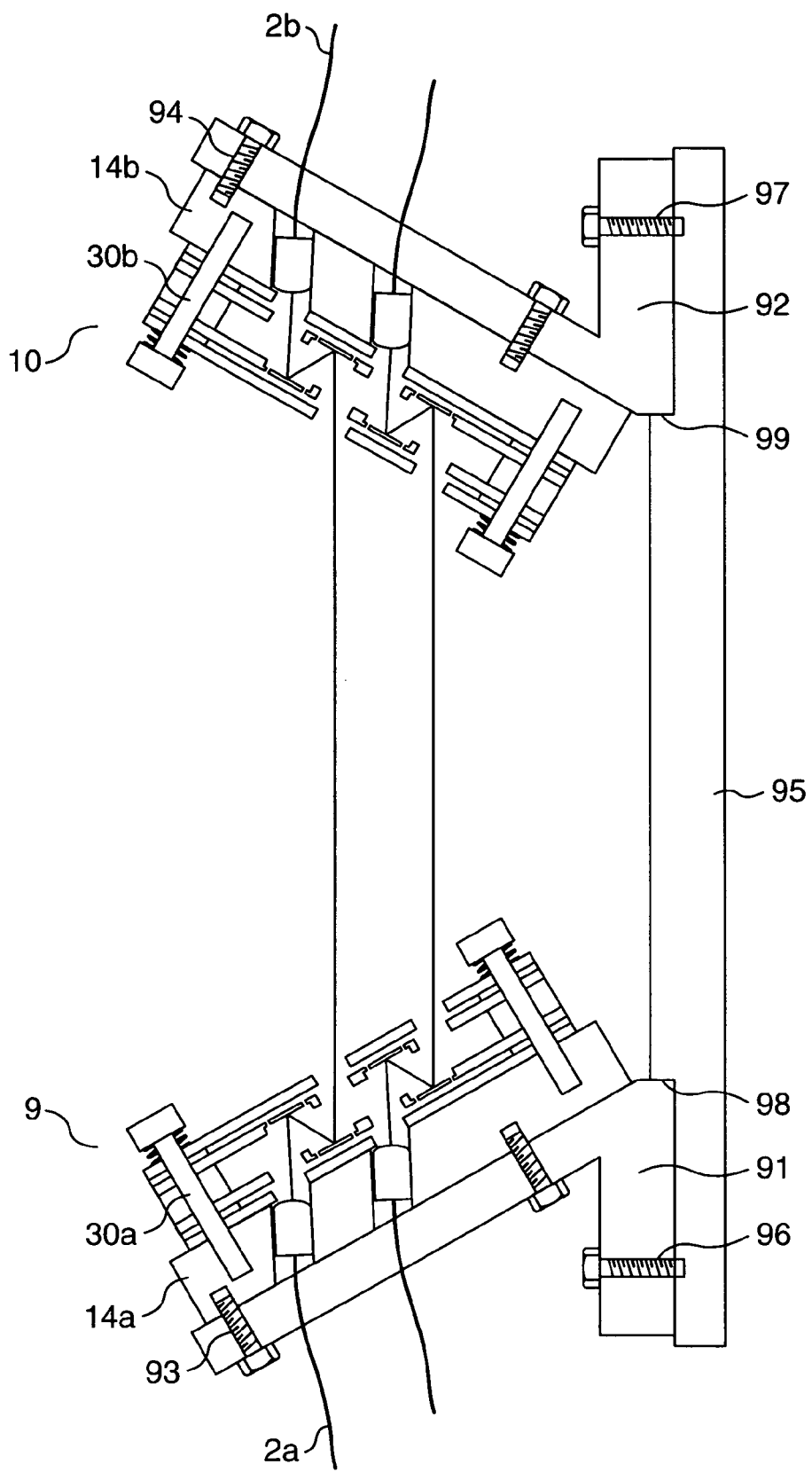
FIG. 13 is a sectional typical view showing the configuration of an optical switch according to an embodiment of the invention.

For example, an optical switch using the aforementioned beam direction modules is configured as shown in FIG. 13. Any one of the aforementioned embodiments can be applied to each beam direction module. A first beam direction module 9 and a second beam direction module 10 used on input and output sides are connected to a first angle member 91 and a second angle member 92 serving as support members, through first connection bolts 93 and second connection bolts 94, respectively. The first angle member 91 and the second angle member 92 are further connected to a common base member 95 through third connection bolts 96 and fourth connection bolts 97, respectively.

Even after the optical switch has been assembled, coupling of light beams between the beam direction modules on the input and output sides can be made in an optimal coupling position when angles of micro-mirrors are adjusted finely. Accordingly, positioning accuracy of the beam direction modules relative to each other need not be so high if each beam can be confined within limits according to the maximum tilt angle of a corresponding mirror. On the other hand, if lenses and mirrors in each beam direction module are displaced from each other at the time of fabrication, it is difficult to correct such displacement afterward. It is therefore preferable that the lenses and mirrors constituting each beam direction module, that is, at least the collimator support member and the first and second mirror substrates are positioned accurately by the same fixing members (pins 30a and 30b) piercing the collimator support member and the first and second mirror substrates. If the beam direction modules on the input and output sides can be positioned relative to each other by the same pins, positioning accuracy will become high. In this case, however, the pins will become long because optical paths between the beam direction modules are long. Moreover, the fabricating method and the method for fixing the lenses and mirrors will become complex. In addition, vibration resistance and shock resistance will become poor in the structure in which the respective members are supported by long and narrow pins. As described above, in this embodiment, the two beam direction modules need not be positioned accurately relative to each other. Accordingly, indirect connection of the two beam direction modules through strong members to make vibration resistance and shock resistance high may be selected rather than direct connection of the two beam direction modules. For example, in the embodiment shown in FIG. 13, the first and second angle members 91 and 92 are positioned while pressed against first and second alignment surfaces 98 and 99 formed in the base member 95, and fixed to the base member 95 by connection bolts. In this manner, this embodiment is characterized in that the aforementioned beam direction modules are fixed to the base member by other fixing members than the fixing members such as bolts for fixing the beam direction modules. This embodiment has particularly shown the case where fixing members used for fixing the beam direction modules to the support members are provided separately from fixing members used for fixing the support members to the base member in such a manner that the beam direction modules are fixed to the base member through the support members provided between the base member and the beam direction modules. As a specific embodiment, the optical switch comprises: a first beam direction module formed in such a manner that pins 29 serving as first fixing members are connected to a first collimator support member; a base member 95 to which the first beam direction module is fixed by third connection bolts 96 serving as third fixing members; and a second beam direction module formed in the same manner as the first beam direction module, that is, in such a manner that the second beam direction module is fixed to the base member by fourth connection bolts 97 serving as fourth fixing members, and that pins serving as second fixing members are connected to a second collimator support member.

The second beam direction module includes: a second collimator support member (equivalent to the first collimator support member) having second collimator lenses (equivalent to the first collimator lenses) connected to optical fibers respectively; a third mirror substrate (equivalent to the first mirror substrate) having third mirrors (equivalent to the first mirrors); and a fourth mirror substrate (equivalent to the second mirror substrate) disposed on a side of the third mirror substrate opposite to a side on which the second collimator support member is disposed, the fourth mirror substrate having fourth mirrors (equivalent to the second mirrors) provided so as to correspond to the third mirrors. Beams emitted from the first beam direction module are formed so that the beams are reflected on the third mirrors and further reflected on the fourth mirrors so that each reflected beam is radiated to selected one of the second collimator lenses. The third mirror substrate is provided with windows through which beams pass after the beams have been reflected on the fourth mirrors. The fourth mirror substrate is provided with windows through which beams pass before the beams are applied on the third mirrors. The second beam direction module further includes second fixing members provided to pierce a stack of the third mirror substrate and the fourth mirror substrate in a direction of lamination.

Specifically, the first and second beam direction modules are once fixed to the common base member through the support members respectively. That is, the first beam direction module is fixed to the base member through the first angle member while the second beam direction module is fixed to the base member through the second angle member. The first beam direction module is fixed to the first angle member by the first connection bolts serving as fifth fixing members. The first angle member is fixed to the base member 95 by the third connection bolts serving as third fixing members. The second beam direction module is fixed to the second angle member by the second connection bolts serving as six fixing members. The second angle member is fixed to the base member 95 by the fourth connection bolts serving as fourth fixing connection members.

When the optical switch is formed in the aforementioned manner, it is possible to form a highly reliable optical switch in which the influence of external force from the outside, or the like, can be restrained so that optical coupling can be secured with high accuracy.

Figure 14:
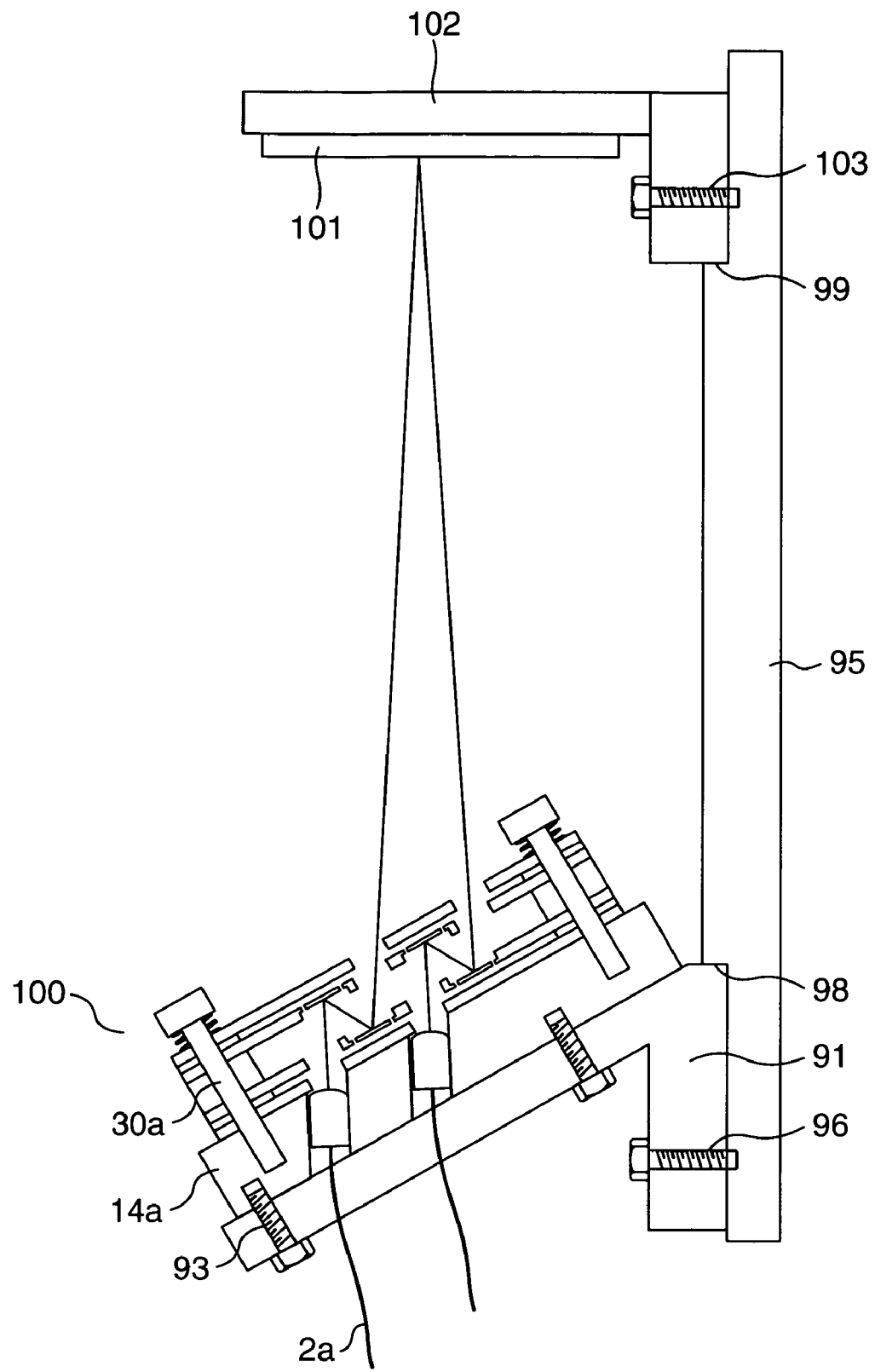
FIG. 14 is a sectional typical view showing the configuration of an optical switch according to an embodiment of the invention.

FIG. 14 shows a further embodiment of the invention concerning use of the beam direction module. As shown in FIG. 14, the second beam direction module shown in FIG. 13 may be replaced by a fixed mirror to thereby form an optical switch using one beam direction module connected to both input and output fibers. The same configuration as that of the aforementioned embodiment can be used as the basic configuration of the beam direction module. That is, an input/output beam direction module 100 is fixed to a base member 95 in the same manner as the first beam direction module depicted in FIG. 13. A fixed mirror 101 is fixed to a fixed mirror support member 102 by a method such as bonding so that the fixed mirror 101 is disposed opposite to the input/output beam direction module 100. The fixed mirror support member 102 is fixed to the base member 95 by connection bolts 103. For example, the fixed mirror support member 102 can be positioned when pressed against a caul surface 99 of the base member 95. In this configuration, optical coupling can be performed when one input fiber and one output fiber are selected from the fibers in the input/output beam direction module 100, and angles of mirrors corresponding to the selected input and output fibers are controlled so that a beam emitted from a lens corresponding to the input fiber is returned to the input/output beam direction module by the fixed mirror 101 so as to be made incident on the output fiber.

As described above, in the further specific embodiment, the optical switch comprises: a beam direction module including a collimator support member, a first mirror substrate, a second mirror substrate, and first fixing members provided to pierce a stack of the first and second mirror substrates in a direction of lamination, the beam direction module formed so that the first fixing members are connected to the collimator support member; a base member to which the beam direction module is fixed by second fixing members provided separately from the first fixing members; and a fixed mirror fixed to the base member by the second fixing members provided separately from the first fixing members.

A beam emitted from one of the first collimator lenses is formed so that the beam passes through a window of the first mirror substrate and is reflected on a second mirror of the second mirror substrate and further reflected on a first mirror of the first mirror substrate so that the reflected beam passes through a window of the second mirror substrate and is radiated to the fixed mirror. Then, the beam reflected on the fixed mirror passes through a window of the second mirror substrate and is reflected on a third mirror of the first mirror substrate and further reflected on a fourth mirror of the second mirror substrate, so that the reflected beam passes through a window of the first mirror substrate and is led into a selected one of the second collimator lenses.

According to the embodiments of the invention, a micromirror array and a collimator array can be positioned accurately relative to each other in a passive alignment manner, so that a three-dimensional optical switch can be provided inexpensively.

The invention can provide an optical matrix switch which can overcome the aforementioned problem and which can be assembled easily with a low loss while a collimator array and a movable mirror array are positioned relative to each other accurately and easily.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A beam direction module comprising:
   a collimator support member including collimator lenses connected to optical fibers respectively;
   a first mirror substrate including first mirrors, and first windows;
   a first driving substrate including driving mechanisms for driving said first mirrors, and second windows;
   a second mirror substrate disposed on a side of said first mirror substrate opposite to a side on which said collimator support member is disposed, said second mirror substrate including second mirrors, and third windows; and
   a second driving substrate including driving mechanisms for driving said second mirrors, and fourth windows, wherein:
   beams emitted from said collimator lenses are formed so that said beams pass through said second windows and said first windows and are reflected on said second mirrors, said beams reflected on said second mirrors are radiated to said first mirrors, and said beams reflected on said first mirrors pass through said third windows and said fourth windows and are radiated to the outside;
   said beam direction module further comprises fixing members provided to pierce a stack of said first mirror substrate, said first driving substrate, said second mirror substrate and said second driving substrate in a direction of lamination; and
   said fixing members are formed so as to be connected to said collimator support member.

2. A beam direction module according to claim 1, further comprising:
   a first driving substrate stacked on said first mirror substrate through a spacer and including driving mechanisms for driving said first mirrors; and
   a second driving substrate stacked on said second mirror substrate through a spacer and including driving mechanisms for driving said second mirrors,
   wherein said first driving substrate and said second driving substrate are disposed while pierced by said fixing members in said direction of lamination.

3. A beam direction module according to claim 1, further comprising mechanisms by which each of said first mirrors rotates around an axis as a first direction while each of said second mirrors rotates around an axis as a second direction different from said first direction.

4. A beam direction module according to claim 1, further comprising pressing mechanisms by which said substrates stacked while pierced by said fixing members are pressed against said collimator support member.

5. A beam direction module according to claim 1, further comprising regions in which beam emission side ends of said collimator lenses are disposed so as to partially protrude from a first mirror substrate side surface of said collimator support member toward said first mirror substrate side.

6. An optical switch comprising:
   a first beam direction module to which first optical fibers are connected; and a second beam direction module which is formed so as to correspond to said first beam direction module and to which second optical fibers are connected, wherein:
a beam input through one of said first optical fibers passes through said first beam direction module and said second beam direction module and is output from said second beam direction module through selected one of said second optical fibers; and
either of said first and second beam direction modules is a beam direction module defined in claim 1.

7. An optical switch comprising a first beam direction module, a second beam direction module, and a base member, wherein:
said first beam direction module includes:
a first collimator support member having first collimator lenses connected to optical fibers respectively;
a first mirror substrate having first mirrors; and
a second mirror substrate disposed on a side of said first mirror substrate opposite to a side on which said first collimator support member is disposed, said second mirror substrate having second mirrors provided so as to correspond to said first mirrors;
beams emitted from said first collimator lenses are formed so that said beams are reflected on said second mirrors and further reflected on said first mirrors and then radiated to the outside;
said first mirror substrate further has windows through which said beams pass before said beams reach said second mirrors, whereas said second mirror substrate further has windows through which said beams reflected on said first mirrors pass;
said first beam direction module further includes first fixing members provided to pierce a stack of said first mirror substrate and said second mirror substrate in a direction of lamination;
said first fixing members are formed so as to be connected to said first collimator support member;
said second beam direction module includes:
a second collimator support member having second collimator lenses connected to optical fibers respectively;
a third mirror substrate having third mirrors; and
a fourth mirror substrate disposed on a side of said third mirror substrate opposite to a side on which said second collimator support member is disposed, said fourth mirror substrate having fourth mirrors provided so as to correspond to said third mirrors;
beams emitted from said first beam direction module are formed so that said beams are reflected on said third mirrors and further reflected on said fourth mirrors so that each of said beams is radiated to selected one of said second collimator lenses;
said third mirror substrate further has windows through which said beams reflected on said fourth mirrors pass, whereas said fourth mirror substrate further has windows through which said beams pass before said beams are applied on said third mirrors;
said second beam direction module further comprises second fixing members provided to pierce a stack of said third mirror substrate and said fourth mirror substrate in a direction of lamination;
said second fixing members are formed so as to be connected to said second collimator support member;
said first beam direction module is fixed to said base member by third fixing members; and
said second beam direction module is fixed to said base member by fourth fixing members.

8. A beam direction module according to claim 7, wherein said driving mechanisms are provided at least in mirror support portions for supporting said mirrors formed in said substrate.

9. A beam direction module according to claim 8, wherein said mirror support portions have first driving mechanisms for driving said mirrors in a first direction, and second driving mechanisms for driving said mirrors in a second direction.

10. A beam direction module according to claim 7, wherein said driving mechanisms drive said mirrors by using piezoelectric elements.

11. A beam direction module according to claim 7, wherein said driving mechanisms drive said mirrors by using electromagnetic force.

12. An optical switch according to claim 7, wherein:
said first beam direction module is fixed to said base member through a first support member while said second beam direction module is fixed to said base member through a second support member;
said first beam direction module is fixed to said first support member by fifth fixing members while said first support member is fixed to said base member by said third fixing members; and
said second beam direction module is fixed to said second support member by sixth fixing members while said second support member is fixed to said base member by said fourth fixing members.

13. An optical switch comprising a beam direction module, a base member, and a fixed mirror, wherein:
said beam direction module includes:
a collimator support member having first and second collimator lenses connected to optical fibers respectively;
a first mirror substrate having first and third mirrors, and windows;
a second mirror substrate disposed on a side of said first mirror substrate opposite to a side on which said collimator support member is disposed, said second mirror substrate having second and fourth mirrors provided so as to correspond to said first and third mirrors of said first mirror substrate, and windows; and
first fixing members provided to pierce a stack of said first mirror substrate and said second mirror substrate in a direction of lamination;
said first fixing members are formed so as to be connected to said collimator support member;
said beam direction module is fixed to said base member by second fixing members;
said fixed mirror is fixed to said base member by third fixing members;
beams emitted from said first collimator lenses are formed so that said beams pass through said windows of said first mirror substrate and are reflected on said second mirrors of said second mirror substrate and further reflected on said first mirrors of said first mirror substrate so that said reflected beams pass through said windows of said second mirror substrate and are radiated to said fixed mirror; and
said beams reflected on said fixed mirror are formed so that said beams pass through said windows of said second mirror substrate and are reflected on said third mirrors of said first mirror substrate and further reflected on said fourth mirrors of said second mirror substrate so that each of said reflected beams passes through corresponding one of said windows of said first mirror substrate and is led into selected one of said second collimator lenses.

14. A beam direction module according to claim 13, wherein said driving mechanisms are provided at least in mirror support portions for supporting said mirrors formed in said substrate.

15. A beam direction module according to claim 14, wherein said mirror support portions have first driving mechanisms for driving said mirrors in a first direction, and second driving mechanisms for driving said mirrors in a second direction.

16. A beam direction module according to claim 13, wherein said driving mechanisms drive said mirrors by using piezoelectric elements.

17. A beam direction module according to claim 13, wherein said driving mechanisms drive said mirrors by using electromagnetic force.

* * * * *